United States Patent
Chou et al.

(10) Patent No.: US 11,548,210 B2
(45) Date of Patent: Jan. 10, 2023

(54) SCREEN PROTECTOR APPLICATION SYSTEM

(71) Applicant: Superior Communications, Inc., Irwindale, CA (US)

(72) Inventors: Vivian Wei-Fen Chou, Diamond Bar, CA (US); Arthur Chen, Arcadia, CA (US)

(73) Assignee: SUPERIOR COMMUNICATIONS, INC., Irwindale, CA (US)

( * ) Notice: Subject to any disclaimer, the term of this patent is extended or adjusted under 35 U.S.C. 154(b) by 0 days.

(21) Appl. No.: 17/110,158

(22) Filed: Dec. 2, 2020

(65) Prior Publication Data

US 2021/0229339 A1 Jul. 29, 2021

Related U.S. Application Data

(60) Provisional application No. 62/965,045, filed on Jan. 23, 2020.

(51) Int. Cl.
*B29C 63/02* (2006.01)
*B32B 37/00* (2006.01)
(Continued)

(52) U.S. Cl.
CPC .............. *B29C 63/02* (2013.01); *B29C 65/48* (2013.01); *B32B 37/025* (2013.01); *B29L 2031/3437* (2013.01); *H04M 1/0266* (2013.01)

(58) Field of Classification Search
CPC . B29C 63/02; B29C 63/0004; B29C 63/0047; B29C 63/0056; B29C 63/0095; B29C 2063/0008; B29C 65/48; B29C 65/7802; B29C 65/7841; B29C 65/7855; B29C 66/342; B29C 66/345; B29C 66/861; B32B 37/025; B32B 37/003; B32B 38/1825; B32B 38/1833; B32B 38/1841; B29L 2031/3437; H04M 1/0266; H04M 1/04
See application file for complete search history.

(56) References Cited

U.S. PATENT DOCUMENTS

D369,465 S 5/1996 Scheid et al.
D390,699 S 2/1998 Goldenberg et al.
(Continued)

FOREIGN PATENT DOCUMENTS

DE 102013021563 A1 * 6/2015 ......... B29C 63/0004

OTHER PUBLICATIONS

US D846,268 S, 05/2019, Cadogan et al. (withdrawn)
(Continued)

*Primary Examiner* — John L Goff, II
(74) *Attorney, Agent, or Firm* — Snell & Wilmer LLP

(57) ABSTRACT

Systems and apparatus for protecting a mobile device. The system includes a screen protector configured to be applied to a screen of the mobile device. The system also includes a cap configured to receive an end of the mobile device and prevent movement of the mobile device relative to the screen protector. The system also includes a pivot strip connecting the cap and the screen protector and being configured to facilitate a pivoting of the screen protector relative to the cap and establish alignment of the screen protector with the screen of the mobile device.

15 Claims, 9 Drawing Sheets

(51) Int. Cl.
*B29C 65/48* (2006.01)
*B29L 31/34* (2006.01)
*H04M 1/02* (2006.01)

(56) References Cited

U.S. PATENT DOCUMENTS

| | | | |
|---|---|---|---|
| 6,176,401 B1 | 1/2001 | Lim | |
| D586,795 S | 2/2009 | Richter | |
| 8,517,367 B1* | 8/2013 | Napier | B32B 37/14 |
| | | | 269/289 R |
| D693,802 S | 11/2013 | Wikel | |
| 8,915,361 B2 | 12/2014 | Rayner | |
| D765,063 S | 8/2016 | Wengreen | |
| 9,688,016 B2 | 6/2017 | Rostami | |
| D797,546 S | 9/2017 | Saideh | |
| 2012/0110868 A1 | 5/2012 | Abbondanzio | |
| 2013/0020005 A1 | 1/2013 | Koblick et al. | |
| 2014/0041799 A1 | 2/2014 | Nam | |
| 2015/0194996 A1* | 7/2015 | Roberts | H04B 1/3888 |
| | | | 455/575.8 |
| 2016/0294428 A1 | 10/2016 | Li | |
| 2017/0001364 A1* | 1/2017 | MacDonald | B29C 65/7802 |

OTHER PUBLICATIONS

Machine translation of DE 102013021563 date uknown.*
Openbazaar.com. Baseus Automatic Screen Protector Tempered Glass Installation Helper For iPhone X XS XR XS Max With Cable Organizer Function; May 31, 2019.
Amazon.com. "iPhone 6s Plus Screen Protector, Foxnovo (5.5") iPhone Tempered Glass Screen Protector—[0.3mm Tempered Glass] and Easy to paste tool Work with Apple iPhone 6 6s Plus"; May 31, 2019.
Amazon.com, tzumi ProGlass Screen Protector for iPhone 6 7 8—Premium High Definition Tempered Glass with Easy Application and Cleaning Kit for High-Definition Clarity, Screen Protection and Scratch-Resistance; May 31, 2019.
Amazon.com. "Benks 2-In-1 Align Tool for iPhone X 10 Tempered Glass Screen Protector"; May 31, 2019.

* cited by examiner

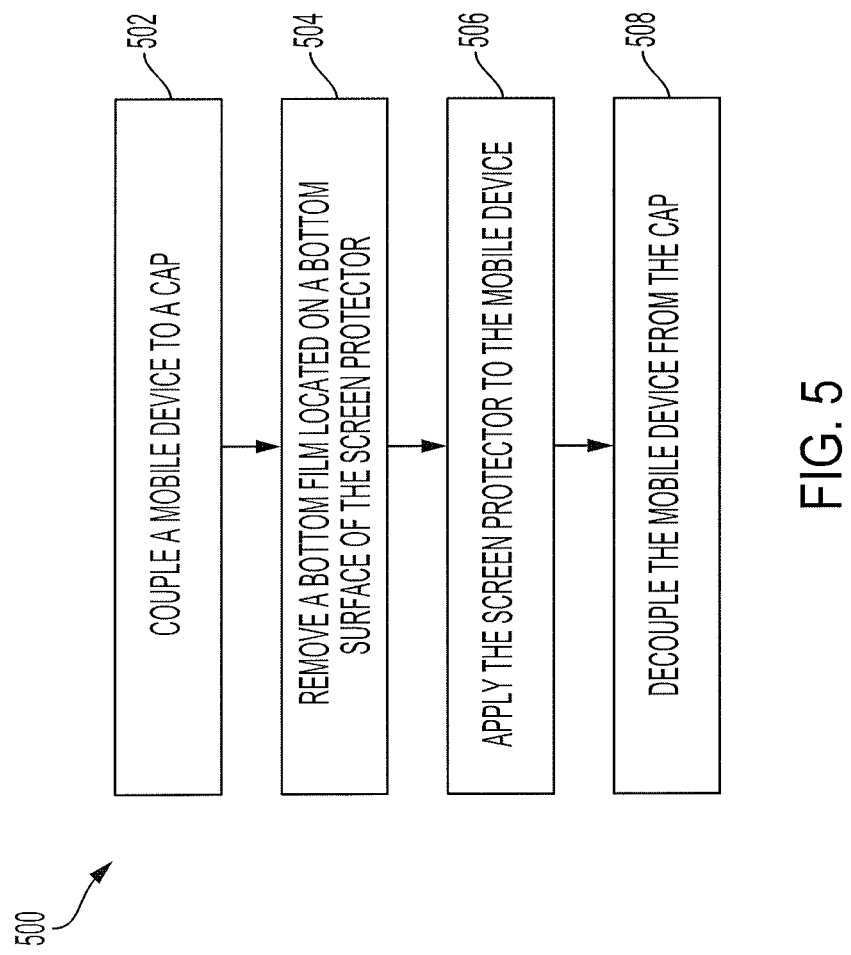

SCREEN PROTECTOR APPLICATION SYSTEM

CROSS-REFERENCE TO RELATED APPLICATIONS

This application claims priority to U.S. Provisional Patent Application No. 62/965,045, titled "SCREEN PROTECTOR APPLICATION SYSTEM," filed on Jan. 23, 2020, the entire contents of which is hereby incorporated by reference herein.

BACKGROUND

1. Field

This specification relates to a system and a method for applying a screen protector to a mobile device.

2. Description of the Related Art

Mobile devices have become more common in everyday life. Individuals commonly carry around one or more mobile devices for purposes of telephone calls, email communication, text messaging, geographic navigation, or web browsing, among other features. In addition, mobile devices have become more sophisticated and expensive, and are commonly offered in a variety of sizes and outer dimensions by multiple different manufacturers or even by the same manufacturer.

As such, users have a desire to protect their mobile devices due to their exposure to a variety of different external substances through everyday use, such as dirt or hand oils. In addition, users have a desire to protect their mobile devices from impact or other damage due to the cost of replacing or repairing such mobile devices.

However, due to the variety of sizes and outer dimensions of mobile devices offered by manufacturers, it may be difficult for a user to properly size and apply an outer surface protector to a mobile device. In addition, improvements are desired in the ease and quickness by which an outer surface protector may be applied to a mobile device, to protect the mobile device.

SUMMARY

What is described is a system for protecting a mobile device. The system includes a screen protector configured to be applied to a screen of the mobile device. The system also includes a cap configured to receive an end of the mobile device and prevent movement of the mobile device relative to the screen protector. The system also includes a pivot strip connecting the cap and the screen protector and being configured to facilitate a pivoting of the screen protector relative to the cap and establish alignment of the screen protector with the screen of the mobile device.

Also described is a method for applying a screen protector to a mobile device. The method includes coupling the mobile device with a cap, the cap connected to the screen protector via a pivot strip. The method also includes removing a bottom film located on a bottom surface of the screen protector. The method also includes applying the screen protector to the mobile device. The method also includes decoupling the mobile device from the cap.

Also described is a cap for applying a screen protector to a mobile device. The cap includes a cavity configured to receive an end of the mobile device. The cap also includes a pivot strip cutout configured to receive a pivot strip connected to the cap and the screen protector and allow the pivot strip to contact the mobile device when the screen protector is applied to the screen of the mobile device.

BRIEF DESCRIPTION OF THE DRAWINGS

Other systems, methods, apparatus, features, and advantages of the present invention will be apparent to one skilled in the art upon examination of the following figures and detailed description. Component parts shown in the drawings are not necessarily to scale, and may be exaggerated to better illustrate the important features of the present invention.

FIG. 5 illustrates a process of applying a screen protector, according to various embodiments of the invention.

DETAILED DESCRIPTION

Disclosed herein are systems and apparatus for applying a screen protector to a mobile device. Conventional application of screen protectors involves manual placement of the screen protector onto the mobile device. This conventional application leads to many errors, as users may not be able to properly align the screen protector to the screen of the mobile device. Many conventional screen protectors cannot be repositioned once applied onto the screen of a mobile device. Thus, users of these conventional application techniques either try again with a new screen protector or settle for having an improperly applied screen protector on their mobile device.

The systems and methods described herein use a cap positioned on an end of the mobile device, with the cap being attached to a screen protector. The cap ensures relative positioning of the screen protector with respect to the mobile device so that alignment is maintained, ensuring a well-placed screen protector onto the mobile device.

Figure 1:
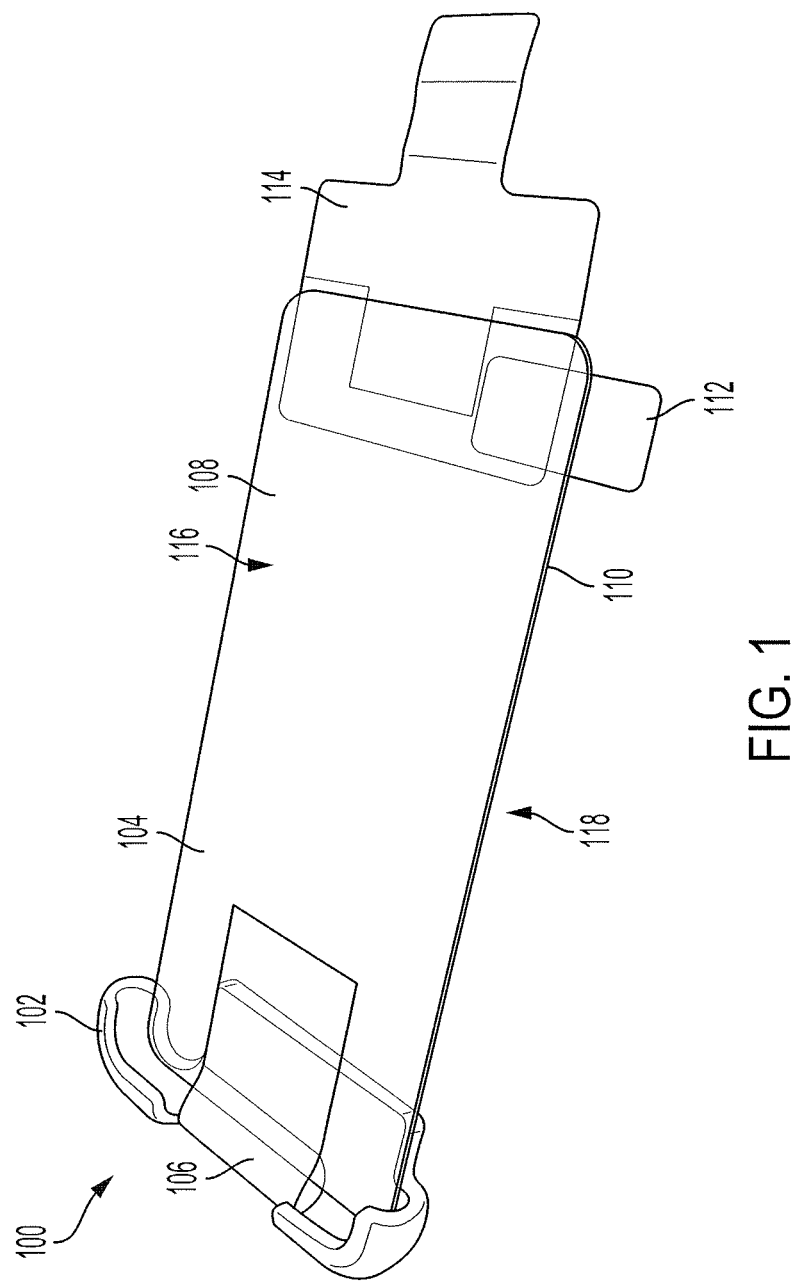
FIG. 1 illustrates a screen protector application system using a cap, according to various embodiments of the invention.

FIG. 1 illustrates components for use in a system 100 for applying a protective layer to a screen of a mobile device. A mobile device may be a smartphone or wearable device (e.g., smart watch) or a tablet computer or other form of computing device or electronic device that is carried by a user. Such mobile devices are often exposed to a variety of different types of external environmental substances, such as dirt or liquid, and are often exposed to hand oils or other substances provided by the user. As such, it is often beneficial to provide a protective layer to the screen of the mobile device, to protect the mobile device from such substances. The protective layer may also reduce the possibility of damage to the mobile device caused by external impact such as dropping the mobile device or other forces applied to the mobile device.

The system 100 includes a cap 102 attached to a screen protector 104. The cap 102 is configured to receive a mobile device and maintain the relative spacing and positioning of the mobile device and the screen protector 104 while the screen protector 104 is applied to the mobile device. The screen protector 104 may be made of a rigid or semi-rigid, transparent material (e.g., glass or plastic) and the screen protector 104 is configured to protect one or more surfaces of a mobile device from scratches or other damage.

The cap 102 is connected to the screen protector 104 via a pivot strip 106. The pivot strip may have an adhesive (interior) side that maintains connection to the cap and the screen protector 104 and may also have a non-adhesive (exterior) side. The pivot strip may have two ends, the first end connected to the cap 102 and the second end connected to the screen protector 104. The pivot strip 106 may be made of any flexible material, such as plastic.

The screen protector 104 may be covered on one or more sides by protective films. The top surface 116 of the screen protector 104 may be covered partially or entirely by a top film 108. The bottom surface 118 of the screen protector 104 may be covered partially or entirely by a bottom film 110. The protective films may be made of any flexible material, such as plastic.

One or more tabs may be connected to the screen protector 104 to facilitate movement of the screen protector 104 by a user without the user touching the screen protector 104 directly. A top tab 114 may be removably attached to the screen protector 104 proximal to an end of the screen protector 104. A side tab 112 may be removably attached to the screen protector 104 on a side of the screen protector 104.

The top tab 114 and/or the side tab 112 may be directly attached to the screen protector 104 or may be attached to a respective film of the screen protector 104. For example, the top tab 114 may be directly attached to the screen protector 104, the top tab 114 may be attached to the top film 108 on top of the top surface 116 of the screen protector 104, or the top tab 114 may be attached to the bottom film 110 of the bottom surface 118 of the screen protector 104. Similarly, the side tab 112 may be directly attached to the screen protector 104, the side tab 112 may be attached to the top film 108 on top of the top surface 116 of the screen protector 104, or the side tab 112 may be attached to the bottom film 110 of the bottom surface 118 of the screen protector 104.

When the tabs are connected to a film of the screen protector 104, the tabs may assist in removal of the film from the respective surface of the screen protector 104.

The pivot strip 106 is attached to the cap 102 on one end of the pivot strip 106 and removably attached to the screen protector 104 on the other end of the pivot strip 106. The pivot strip 106 may be directly attached to the screen protector 104 or may be attached to a film of the screen protector. The pivot strip 106 may be attached to the top surface 116 of the screen protector 104 or may be attached to a top film 108 covering the top surface 116 of the screen protector 104.

The system 100 may be assembled as shown in FIG. 1 and provided to the user to use in applying the screen protector 104 to a mobile device. FIGS. 2A-2E illustrate a process of using the system 100 to apply the screen protector 104 to a mobile device.

Figure 2A:
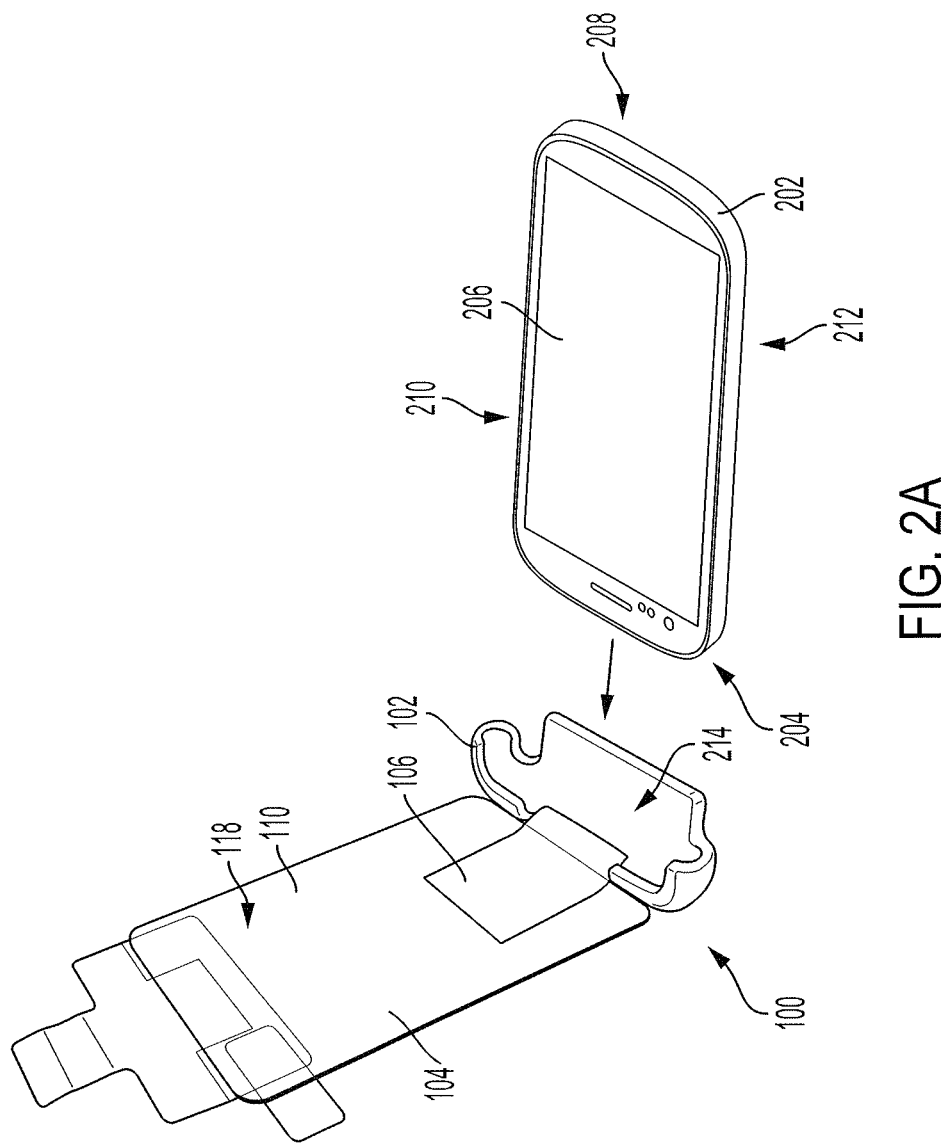
FIGS. 2A-2E illustrate a process for applying a screen protector using the screen protector application system, according to various embodiments of the invention.

FIG. 2A shows the system 100 with the screen protector 104 being pivoted upward relative to the cap 102 via the pivot strip 106. The bottom surface 118 of the screen protector 104 and the bottom film 110 covering the bottom surface 118 of the screen protector 104 are also shown. The cap 102 defines or includes a cavity 214 configured to receive the mobile device 202.

The mobile device 202 has a top edge 204, a bottom edge 208, a top surface 210, and a bottom surface 212. The mobile device 202 also has a screen 206 which the screen protector 104 will be applied to. The size of the screen protector 104 may correspond with the screen 206 or the entire top surface 210 of the mobile device 202.

Figure 2B:
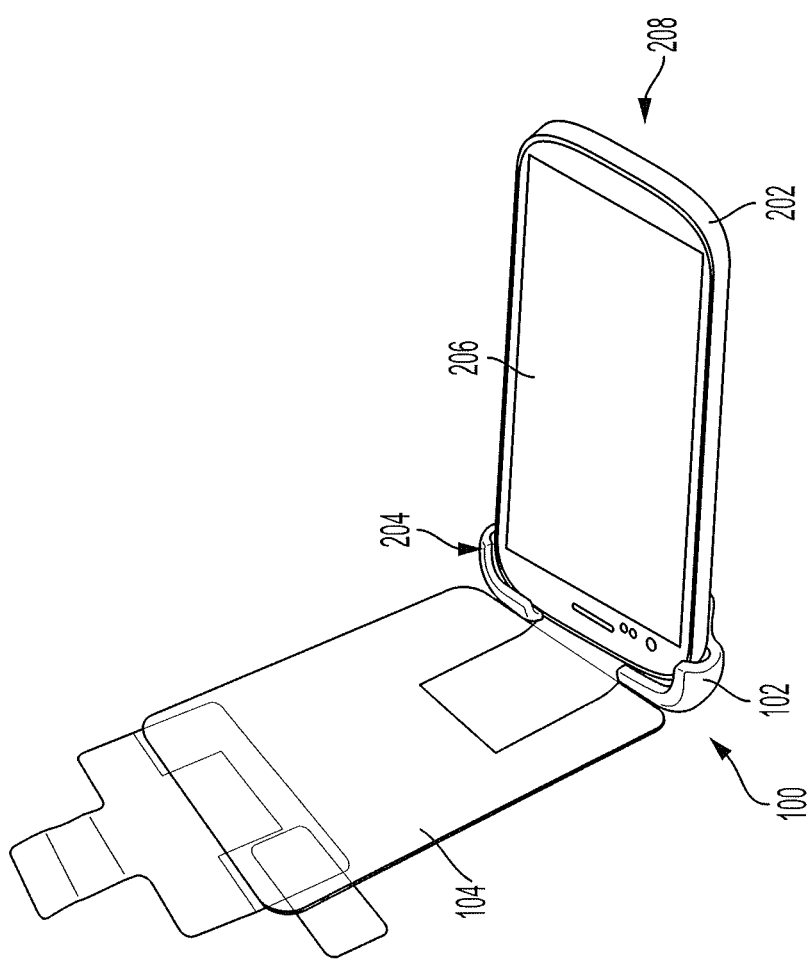

FIG. 2B shows the top edge 204 of the mobile device 202 being received by the cap 102. In particular, the top edge 204 of the mobile device 202 is received by the cavity 214 of the cap 102. While the figures and descriptions herein refer to the top edge 204 being received by the cap 102, in other embodiments, the bottom edge 208 may be received by the cap 102 or either of the side edges may be received by the cap 102. Similarly, while the figures and descriptions herein show the top surface 210 of the mobile device 202 having the screen protector 104 applied to it, in other embodiments, the bottom surface 212 or any side surfaces may have a protective material applied to it.

As shown in FIG. 2B, when the cap 102 receives the mobile device 202, the screen protector 104 is aligned with the screen 206 such that when the screen protector is pivoted toward the mobile device 202 via the pivot strip 106, the screen protector 104 covers the screen 206. In this way, alignment error from the user is reduced, resulting in a better-protected mobile device 202.

Figure 2C:
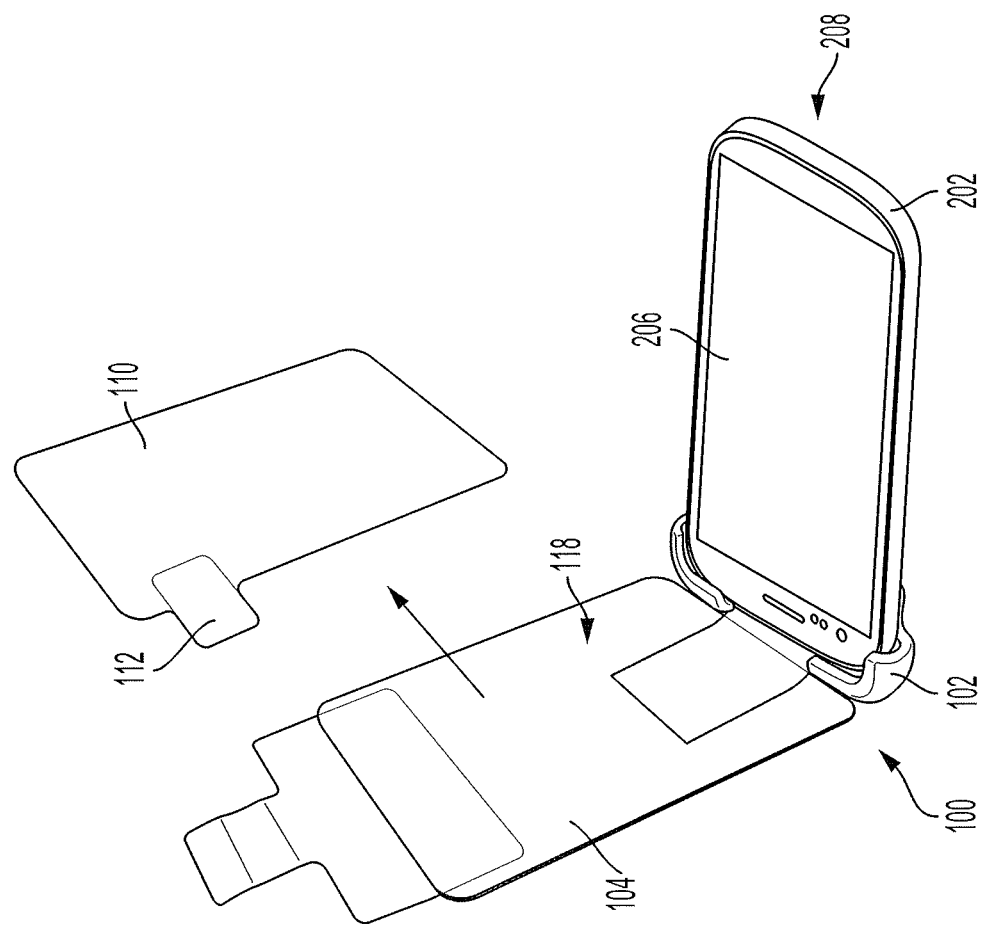

FIG. 2C illustrates the bottom film 110 being removed from the bottom surface 118 of the screen protector 104. A user may remove the bottom film 110 by grasping the side tab 112 attached to the bottom film 110 and peeling the bottom film 110 away from the bottom surface 118 of the screen protector 104. An adhesive may cover all or part of the bottom surface 118 of the screen protector 104, and removing the bottom film 110 exposes the adhesive. The adhesive is used to adhere the screen protector 104 to the top surface 210 of the mobile device. In some embodiments, there is no adhesive disposed on the bottom surface 118 of the screen protector 104 and the screen protector 104 adheres to the top surface 210 of the mobile device via other means, such as static.

Figure 2D:
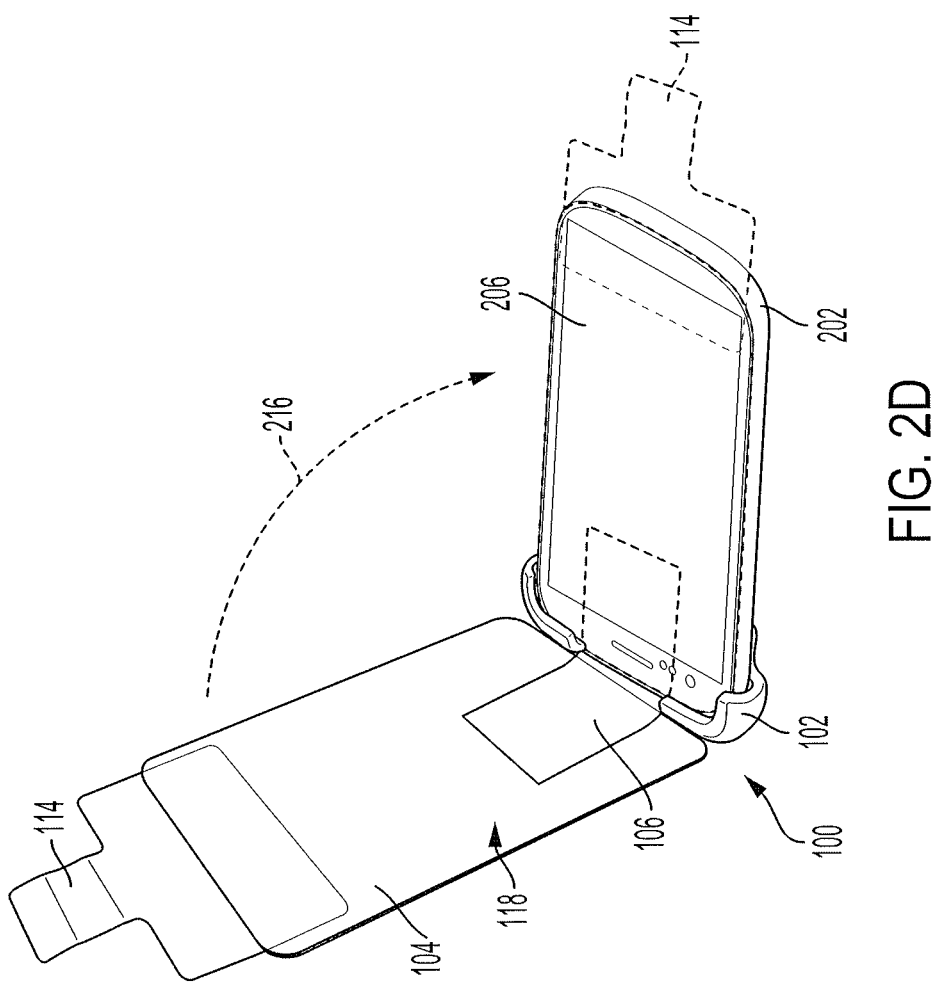

FIG. 2D illustrates the screen protector 104 being applied to the mobile device 202. The screen protector 104 is pivoted toward the mobile device 202 in an application direction 216, pivoting via the pivot strip 106. The user may pivot the screen protector 104 in the application direction 216 by grasping the top tab 114 and pivoting the screen protector 104 via the pivot strip 106.

When the screen protector 104 is applied to the mobile device 202, the adhesive disposed on the bottom surface 118 of the screen protector 104 contacts the top surface 210 of the mobile device 202, providing adhesion. When the screen protector 104 is applied, the screen 206 is now protected.

Figure 2E:
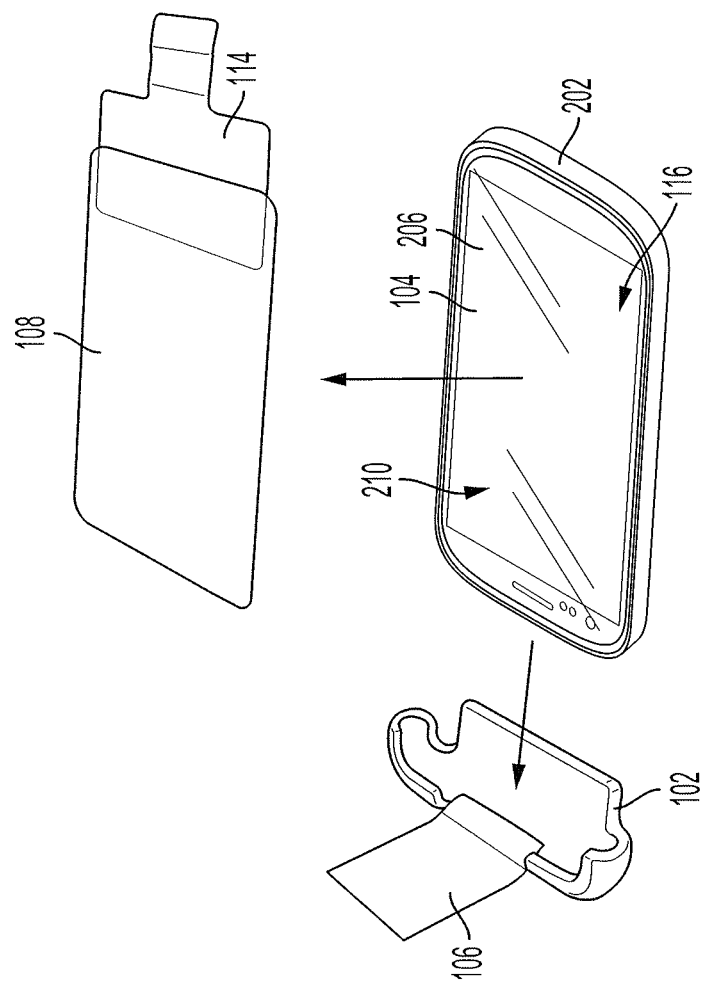

FIG. 2E illustrates removal of the top film 108 from the top surface 116 of the screen protector 104 and removal of the mobile device 202 from the cap 102. A user may grasp the top tab 114 attached to the top film 108 to peel away the top film from the top surface 116 of the screen protector 104. In some embodiments, there is not a top film 108 to be removed, and the top tab 114 is removably attached to the top surface 116 of the screen protector 104 and can be peeled off by the user.

A user may also decouple the cap 102 from the mobile device 202. In embodiments where the pivot strip 106 is attached to the top film 108, removing the top film 108 from the top surface 116 of the screen protector 104 allows the cap 102 to be decoupled from the mobile device 202. In these embodiments, the cap 102 may remain attached to the top film 108 even after decoupling the cap 102 from the mobile device 202. In embodiments where the pivot strip 106 is attached to the top surface 116 of the screen protector 104, the user may peel off the pivot strip 106 from the top surface 116 of the screen protector to decouple the cap 102 from the mobile device 202.

Once the cap 102 is decoupled from the mobile device 202, the top surface 210 of the mobile device 202 (including the screen 206) is now protected by the screen protector 104.

Figure 3:
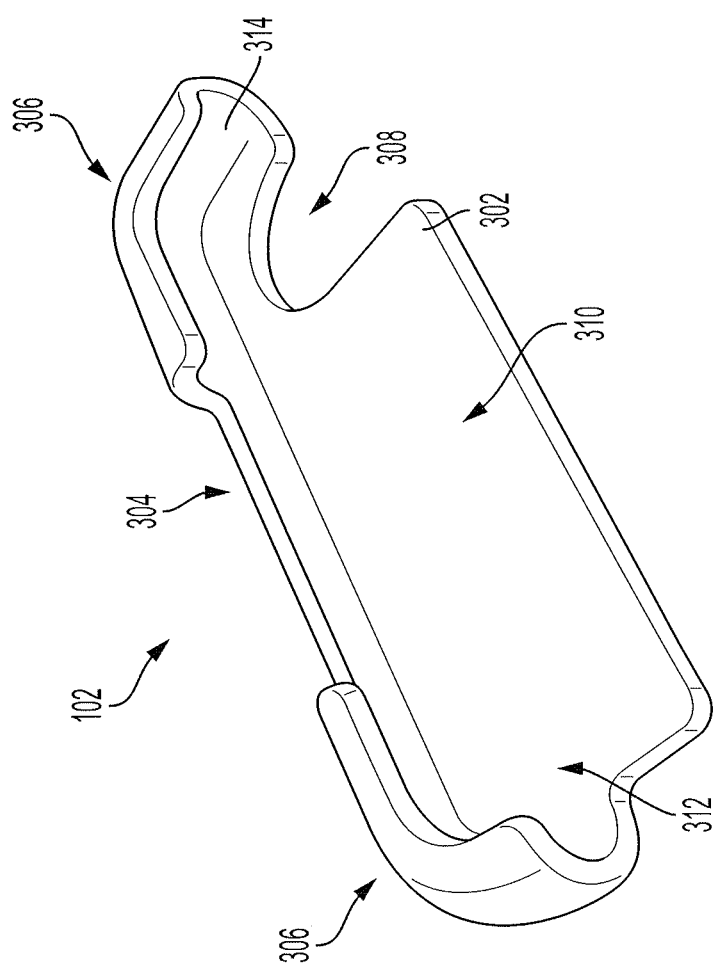
FIG. 3 illustrates a cap of the screen protector application system, according to various embodiments of the invention.

FIG. 3 illustrates the cap 102. The cap 102 may have a size and shape corresponding to a particular make and model of mobile device. The cap 102 may be made of any rigid or semi-rigid material, such as plastic, metal, or silicone. The cap 102 includes a base portion 302 having a base portion surface 310 configured to contact the bottom surface 212 of the mobile device 202. The base portion 302 provides stability for the cap 102 when the cap 102 is coupled to the mobile device 202.

The cap 102 also includes one or more shoulders 306 configured to engage one or more respective portions of an edge (e.g., top edge 204, bottom edge 208, or side edges) of the mobile device 202. The shoulders 306 surround one or more respective corners of the mobile device 202 and prevent horizontal (widthwise) movement of the mobile device 202 relative to the screen protector 104 when the cap 102 is coupled to the mobile device 202. The interior surface 314 of the cap 102 contacts the one or more corners and/or edges of the mobile device 202 when the cap 102 is coupled to the mobile device 202. In some embodiments, there is no base portion 302, and the cap 102 is comprised of only the shoulders 306.

The cap 102 includes a pivot strip cutout 304 configured to receive the pivot strip 106 and allow the pivot strip 106 to make contact with the mobile device 202 when the mobile device 202 is coupled with the cap 102. The pivot strip cutout 304 facilitates more accurate application of the screen protector 104 by providing more clearance for the top edge of the screen protector as the screen protector is being applied to the mobile device 202. The pivot strip cutout 304 also facilitates more accurate application of the screen protector 104 by eliminating any gap between the screen protector 104 and the mobile device 202 caused by the thickness of the cap 102.

The cap 102 also includes a feature cutout 308 to accommodate for any physical features on the bottom surface 212 of the mobile device 202, such as a camera or fingerprint sensor. In some embodiments, there are multiple feature cutouts 308, and in other embodiments, there are no feature cutouts.

The cap 102 includes a cavity 312 similar to cavity 214 configured to receive the mobile device 202. The cavity 312 is defined by the shoulders 306. If present, the base portion 302 also defines the cavity 312. An interior surface of the cavity 312 corresponds to the interior surface 314 of the cap 102.

Figure 4:
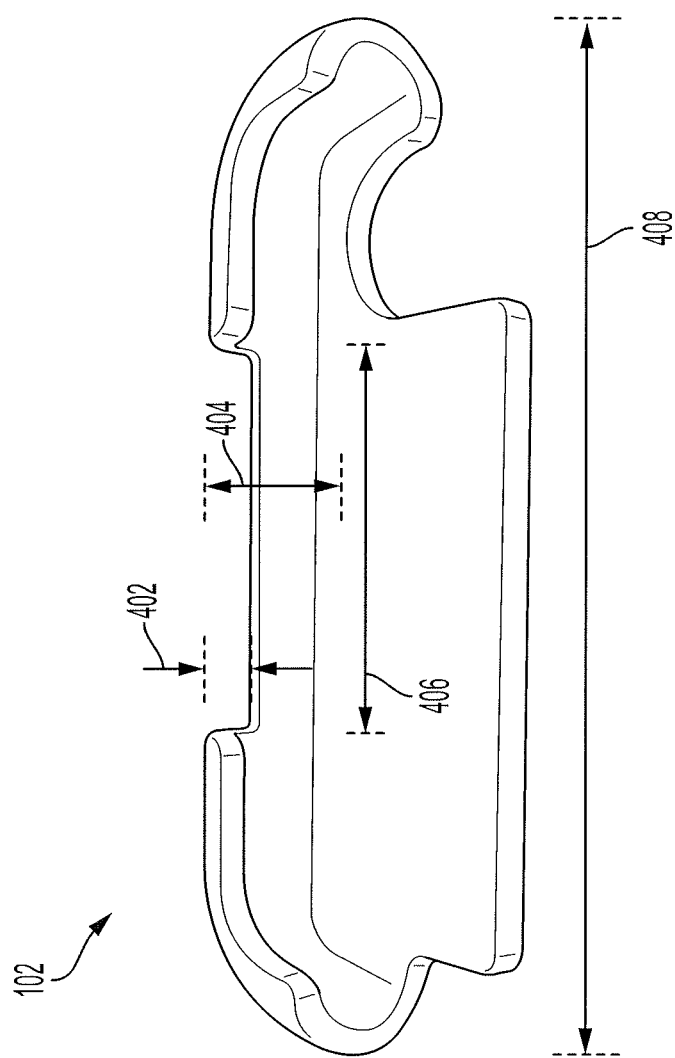
FIG. 4 illustrates dimensions of the cap of the screen protector application system, according to various embodiments of the invention.

FIG. 4 illustrates dimensions of the cap 102. The cap 102 has a cap height 404 and a cap width 408. The pivot strip cutout 304 has a pivot strip cutout height 402 and a pivot strip cutout width 406. The pivot strip cutout height 402 corresponds to the distance from the top of the cap 102 to the pivot strip cutout 304. The pivot strip cutout height 402 may be between 30% and 70% of the cap height 404. The pivot strip cutout width 406 may correspond to the width of the pivot strip 106. The pivot strip cutout width 406 may be between 30% and 70% of the cap width 408.

FIG. 5 illustrates a flowchart of a process 500 of using the system 100 described herein. A mobile device (e.g., mobile device 202) is coupled to a cap (e.g., cap 102) (step 502). In particular, the mobile device is received by a cavity (e.g., cavity 214, 312) of the cap. The top edge (e.g., top edge 204), the bottom edge (e.g., bottom edge 208) or any side edge of the mobile device may be received by the cavity.

A bottom film (e.g., bottom film 110) located on the bottom surface (e.g., bottom surface 118) of the screen protector (e.g., screen protector 104) is removed (step 504). The bottom film may be removed by a user grasping a side tab (e.g., side tab 112) attached to the bottom film and peeling the bottom film off of the bottom surface of the screen protector. The bottom film may cover all of the bottom surface of the screen protector or may cover only a portion of the bottom surface of the screen protector. Removing the bottom film exposes an adhesive disposed on the bottom surface of the screen protector.

The screen protector is applied to the mobile device (step 506). The screen protector may be applied to the mobile device by pivoting the screen protector via a pivot strip (e.g., pivot strip 106) connecting the screen protector and the cap. The screen protector may be pivoted toward the mobile device such that the bottom surface of the screen protector is moved toward the mobile device. The screen protector may be pivoted toward the mobile device by a user grasping a top tab (e.g., top tab 114) attached to a top surface (e.g., top surface 116) of the screen protector. In this way, the user is able to move the screen protector without risking touching the bottom surface of the screen protector. When applied, the bottom surface of the screen protector is in contact with the top surface of the mobile device.

A top film (e.g., top film 108) attached to the top surface of the screen protector is removed. The top film may be removed by a user grasping the top tab and peeling the top film from the top surface of the screen protector.

The mobile device is decoupled from the cap (step 508). In some embodiments, when the pivot strip is connected to the top film, removing the top film from the top surface of the screen protector may also allow the mobile device to be decoupled from the cap. In some embodiments, when the pivot strip is connected directly to the top surface of the screen protector, a user may peel the pivot strip from the top surface of the screen protector allowing the cap to be decoupled from the mobile device. Once the cap is decoupled from the mobile device, the top surface of the mobile device (including the screen) is now protected by the screen protector.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for protecting a mobile device, the system comprising:
 a screen protector configured to be applied to a screen of the mobile device;
 a cap having a pivot strip cutout and configured to wrap around a front and a back of the mobile device at an end of the mobile device, terminate near the end of the mobile device, and prevent movement of the mobile device relative to the screen protector; and
 a pivot strip connecting the cap and the screen protector and being configured to facilitate a pivoting of the screen protector relative to the cap and establish alignment of the screen protector with the screen of the mobile device, wherein the pivot strip cutout is configured to receive the pivot strip and allow the pivot strip to contact the mobile device when the screen protector is applied to the screen of the mobile device.

2. The system of claim 1, wherein the pivot strip cutout has a pivot strip cutout height being between 30 percent and 70 percent of a height of the cap.

3. The system of claim 1, wherein the pivot strip cutout has a pivot strip cutout width being between 30 percent and 70 percent of a width of the cap.

4. The system of claim 1, wherein the cap is configured to receive a top end of the mobile device or a bottom end of the mobile device.

5. The system of claim 1, wherein the cap comprises a plurality of shoulders configured to surround respective corners of the mobile device when the cap receives the mobile device.

6. The system of claim 5, wherein the cap comprises a base portion extending from the plurality of shoulders and configured to contact a back side of the mobile device.

7. The system of claim 6, wherein the base portion terminates near the end of the mobile device.

8. The system of claim 6, wherein the base portion defines a cutout configured to expose a camera of the mobile device.

9. The system of claim 1, wherein the pivot strip is removably coupled to the screen protector.

10. The system of claim 1, further comprising:
a top film removably covering a top surface of the screen protector; and
a bottom film removably covering a bottom surface of the screen protector, the bottom film configured to be removed prior to application of the screen protector to the mobile device.

11. The system of claim 10, wherein the pivot strip is adhered to the top film or the top surface of the screen protector.

12. The system of claim 10, further comprising a first tab coupled to the top film and a second tab coupled to the bottom film, the second tab configured to be grasped by a user to remove the bottom film from the bottom surface of the screen protector, and the first tab configured to be grasped by the user to pivot the screen protector toward the mobile device and apply the screen protector to the mobile device.

13. The system of claim 12, wherein the first tab is coupled to the top film along a width of the top film and extends from a widthwise edge of the top film.

14. The system of claim 12, wherein the second tab is coupled to the bottom film along a length of the bottom film and extends from a lengthwise edge of the bottom film.

15. The system of claim 1, wherein the pivot strip cutout exposes only a portion of the end of the mobile device.

* * * * *